(12) United States Patent
Sakai

(10) Patent No.: US 8,255,911 B2
(45) Date of Patent: Aug. 28, 2012

(54) SYSTEM AND METHOD FOR SELECTING AND ASSIGNING A BASIC MODULE WITH A MINIMUM TRANSFER COST TO THREAD

(75) Inventor: Ryuji Sakai, Hanno-shi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 185 days.

(21) Appl. No.: 12/768,538

(22) Filed: Apr. 27, 2010

(65) Prior Publication Data
US 2010/0275213 A1    Oct. 28, 2010

(30) Foreign Application Priority Data

Apr. 28, 2009 (JP) ................................ 2009-110090

(51) Int. Cl.
*G06F 9/46* (2006.01)
*G06F 9/45* (2006.01)
*G06F 15/00* (2006.01)
(52) U.S. Cl. ........ 718/102; 718/104; 717/149; 717/151; 717/155; 717/156; 712/215
(58) Field of Classification Search .................... 718/102
See application file for complete search history.

(56) References Cited

U.S. PATENT DOCUMENTS

| | | | |
|---|---|---|---|
| 5,485,612 A | 1/1996 | Ota et al. | |
| 7,437,461 B2 * | 10/2008 | Sugizaki | 709/226 |
| 8,051,412 B2 * | 11/2011 | Kasahara et al. | 717/149 |
| 2005/0267970 A1 * | 12/2005 | Sugizaki | 709/225 |
| 2007/0255929 A1 * | 11/2007 | Kasahara et al. | 712/1 |
| 2007/0283337 A1 * | 12/2007 | Kasahara et al. | 717/149 |
| 2007/0283358 A1 | 12/2007 | Kasahara et al. | |
| 2008/0271041 A1 * | 10/2008 | Sakai | 718/107 |
| 2009/0083751 A1 * | 3/2009 | Sakai | 718/105 |

FOREIGN PATENT DOCUMENTS

JP    04-257928    9/1992
(Continued)

OTHER PUBLICATIONS

Kimura et al., "Multigrain Parallel Processing on Compiler Cooperative Chip Multiprocessor", IEEE, 2005, pp. 1-10.*

(Continued)

*Primary Examiner* — Jennifer To
(74) *Attorney, Agent, or Firm* — Blakey, Sokoloff, Taylor & Zafman LLP

(57) ABSTRACT

According to one embodiment, parallel processing optimization method for an apparatus configured to assign dynamically a part of some of basic modules, into which a program is divided and which comprise a execution rule which defines a executing order of the basic modules and are executable asynchronously with another modules, to threads includes identifiers based on the execution rule wherein the some of the basic modules are assignable to the threads, and configured to execute in parallel the threads by execution modules, the method includes managing the part of some of the basic modules and the identifiers of the threads assigned the part of some of the basic modules, managing an executable set includes the some of the basic modules, calculating transfer costs of the some of the basic modules when data, and selecting one of the basic module with a minimum transfer cost in the transfer costs.

7 Claims, 8 Drawing Sheets

FOREIGN PATENT DOCUMENTS

| | | |
|---|---|---|
| JP | 2001-155001 | 6/2001 |
| JP | 2005-258920 | 9/2005 |
| JP | 2005-322107 | 11/2005 |
| JP | 2007-328415 | 12/2007 |
| JP | 2008-276547 | 11/2008 |
| JP | 2009-080583 | 4/2009 |

OTHER PUBLICATIONS

Hormati et al., "Flextream: Adaptive Compilation of Streaming Applications for Heterogenous Architectures", IEEE, 2009, pp. 214-223.*

* cited by examiner

Time

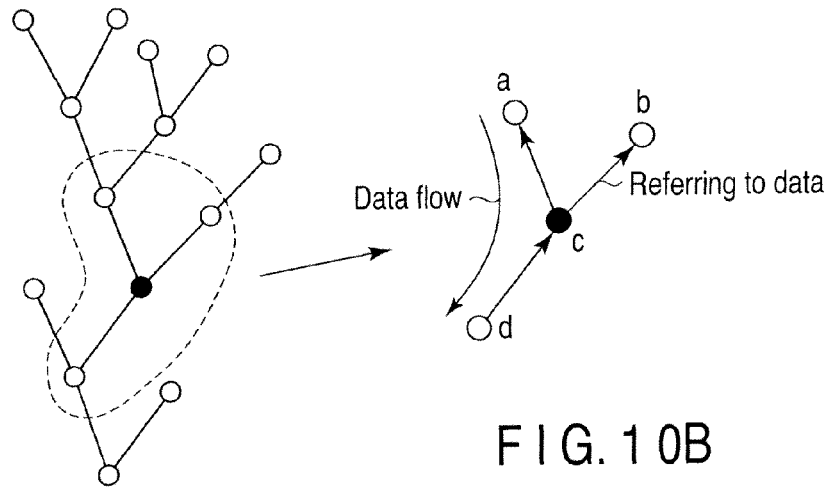
FIG. 10A
FIG. 10B
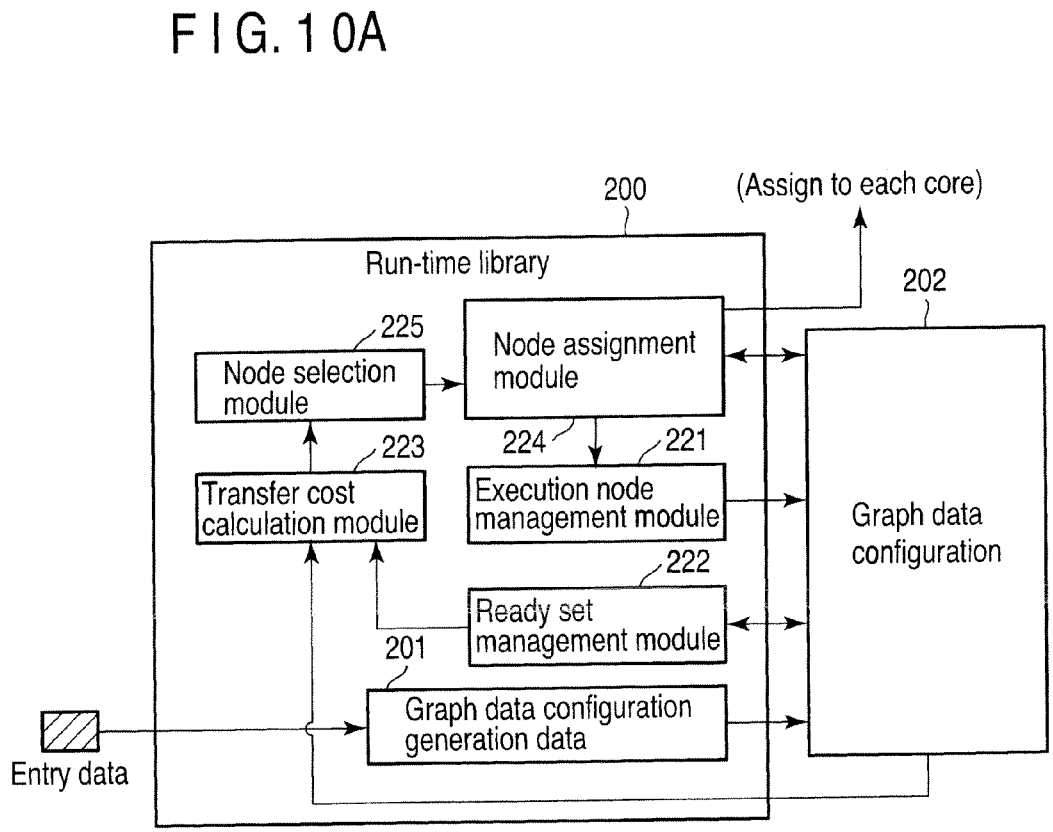
FIG. 11

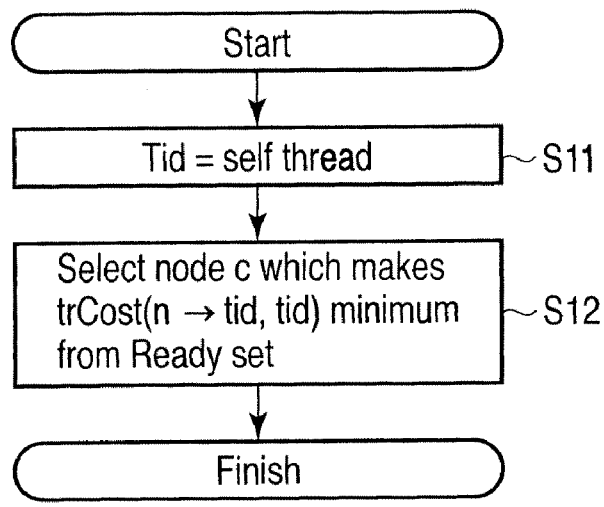
F I G. 1 2
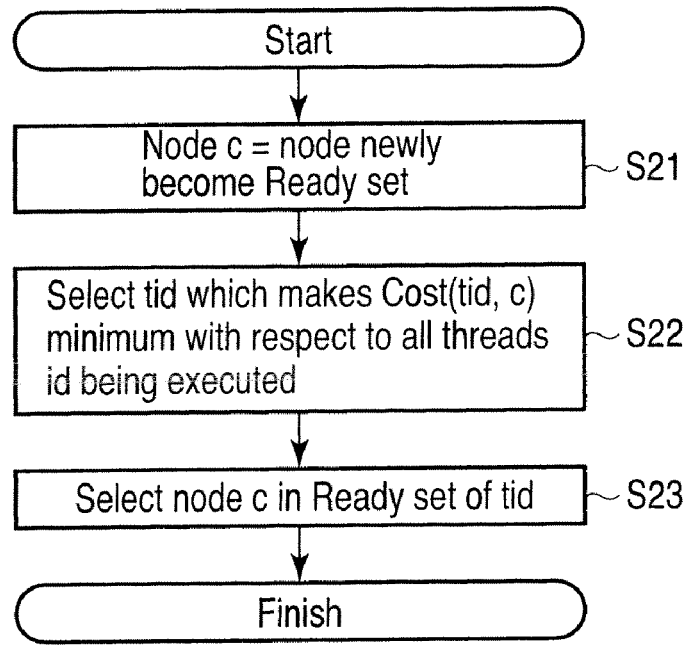
F I G. 1 3

SYSTEM AND METHOD FOR SELECTING AND ASSIGNING A BASIC MODULE WITH A MINIMUM TRANSFER COST TO THREAD

CROSS-REFERENCE TO RELATED APPLICATIONS

This application is based upon and claims the benefit of priority from Japanese Patent Application No. 2009-110090, filed Apr. 28, 2009, the entire contents of which are incorporated herein by reference.

FIELD

Embodiments described herein relate generally to a parallel processing control technique for a program suitable for, for example, a computer installed with a CPU which contains CPU cores built therein, or a computer installed CPUs.

BACKGROUND

Recent years, various types of personal computers such as notebook types and desktop types are widely available. For these types of computers, there has been an increasing demand for enhancing their data processing abilities such as in the reproduction of high definition video image data by software, and the performance of the CPU has been enhanced nearly to its limitation.

Under such circumstances, recently, there are such computers being developed in which CPUs are mounted, or those which are installed with a CPU containing CPU cores built therein. That is, a program is processed in parallel so as to shorten the time required for the process, thereby enhancing the performance of the computer. There have been various proposals for the mechanism of executing the parallel processing of a program efficiently.

For example, Jpn. Pat. Appln. KOKAI Publication No. 2007-328415 discloses a method of controlling a (heterogeneous) multiprocessor, in which a value obtained by addition of a processing cost and a transfer cost in the first processor and another value obtained by addition of a processing cost and a transfer cost in the second processor are compared with each other, and tasks are assigned to the processors.

The above-mentioned document discloses the technique of a complier. The number of CPU cores differs from one multiprocessor to another in those which are currently commercially available. Therefore, it is necessary to provide a program which has been complied in accordance with the number of CPU cores.

BRIEF DESCRIPTION OF THE DRAWINGS

FIG. 10A and FIG. 10B are diagram showing a graph data structure managed by a parallel execution environment;

FIG. 11 is a block diagram showing a configuration of the run-time library;

FIG. 12 is a flowchart showing a procedure of process of selecting a node from a ready set;

FIG. 13 is a procedure of a registration process in the case where each thread has a ready set;

DETAILED DESCRIPTION

In general, according to one embodiment, an information processing apparatus configured to execute a program which is divided into basic modules executable asynchronously with another modules and comprises an execution rule which defines an executing order of the basic modules, the apparatus includes execution modules configured to execute threads comprising identifiers, and a scheduler configured to assign dynamically a part of some of the basic modules to the threads to be executed by the execution modules based on the execution rule so that the threads are executed in parallel, the some of the basic modules are assignable to the threads, wherein the scheduler includes a first manager configured to manage the part of some of the basic modules and the identifiers of the threads assigned the part of some of the basic modules, a second manager configured to manage an executable set comprising the some of the basic modules, a cost calculator configured to calculate transfer costs of the some of the basic modules when data, which is a calculation result of a first basic module of the basic modules and is referred from a second basic module of the some of the basic modules, are transferred from a first thread of the threads which is assigned the first basic module to a second thread based on a size of the data and an identifier of the first thread managed by the first manager, and a selector configured to select one of the basic module with a minimum transfer cost in the transfer costs as one of the part of the some of the basic modules to be assigned to the second thread.

An embodiment of the present invention will now be described with reference to accompanying drawings.

Figure 1:
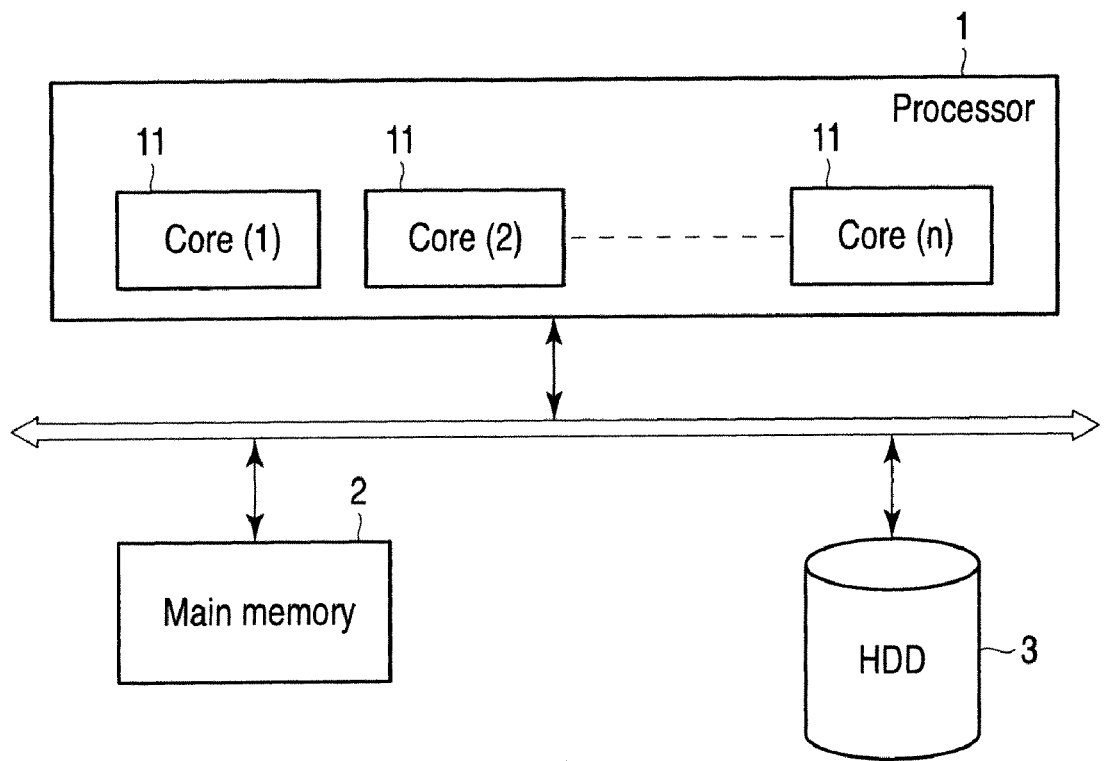
FIG. 1 is a diagram showing an example of the system configuration of a data processing apparatus according to an embodiment of the present invention.

FIG. 1 is a diagram showing an example of the system configuration of a data processing apparatus according to an embodiment of the present invention. The data processing apparatus is realized here in the form of the so-called personal computer of the notebook type or desktop type. As shown in FIG. 1, this computer comprises a processor 1, a main memory 2 and a hard disk drive (HDD) 3, which are connected to each other via an internal bus.

The processor 1 is a central processing unit (CPU) which controls the execution of a program loaded in the main memory from the HDD 3, which is a memory medium readable by a data processing apparatus such as a computer, and the processor 1 contains cores 11 each being an operation circuit (CPU core) of a main part built therein.

The main memory 2 is a memory device formed of, for example, semiconductor, accessible by the processor 1, whereas the HDD 3 is a memory medium of a low-speed mass storage (as compared to the main memory 2), which serves a role as an auxiliary memory in this computer.

Further, although they are not illustrated in the drawings, input and output devices such as a display which displays the results of processing a program by the processor 1 and a keyboard for entering processing data, etc. are further provided in the case of, for example, a notebook type. In the case of, for example, a desktop type, these devices are connected externally via cables or the like.

The computer installed with the processor 1 containing cores 11 built therein is able to execute programs in parallel, or also able to execute processes in parallel in one program. Here, with reference to FIG. 2, a brief configuration of a program specified for the parallel process executed by the computer will now be described.

Figure 2:
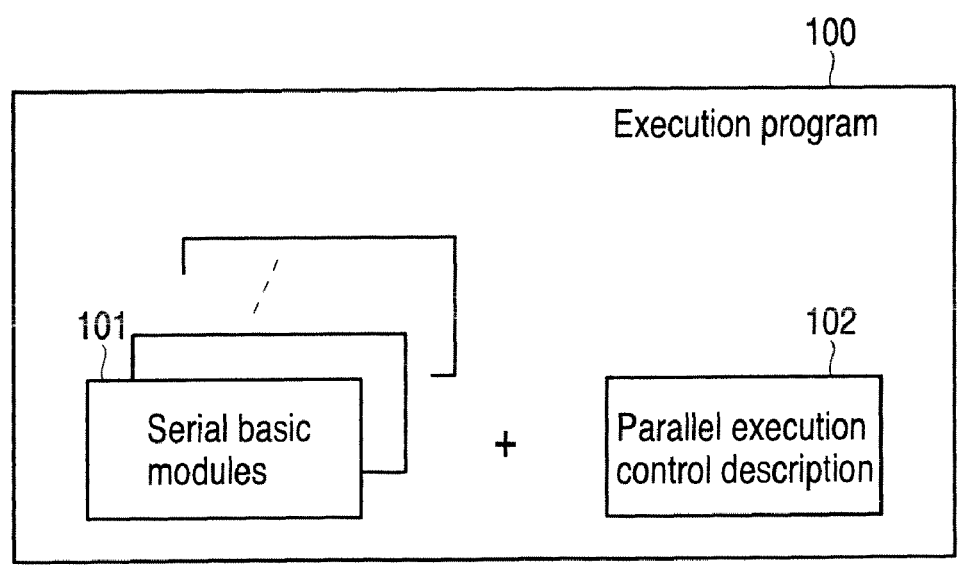
FIG. 2 is a diagram which explains the brief configuration of a program specified for the parallel processing, to be executed by the data processing apparatus of the embodiment.

As shown in FIG. 2, an execution program 100 specified for the parallel process and executed by this computer comprises serial basic modules 101 and a parallel execution control description 102 which defines in what order the serial basic modules 101 should be executed.

Figure 3:
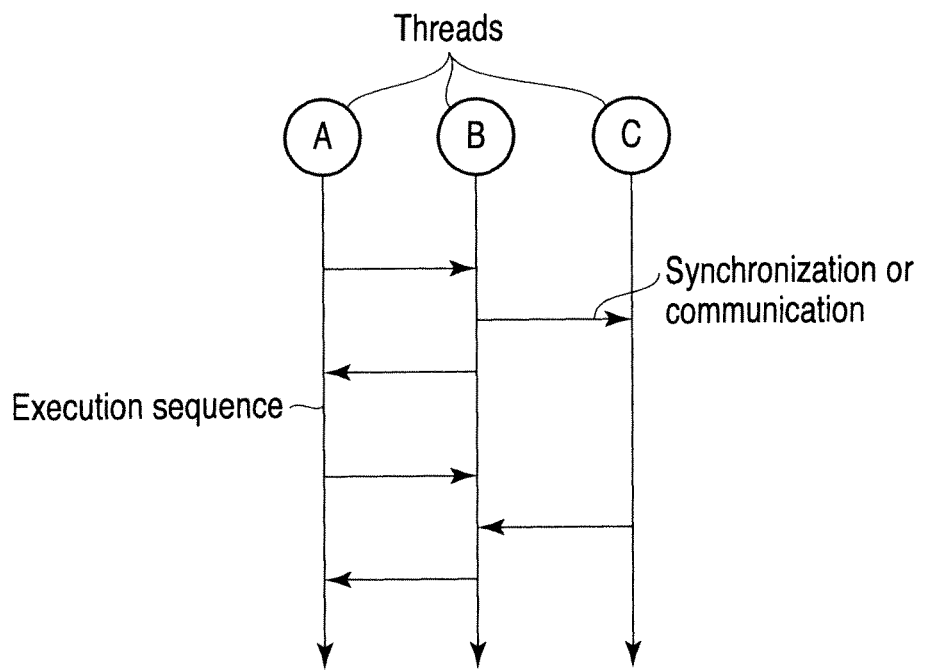
FIG. 3 is a diagram showing a general multi-thread process.

In the so-called multi-thread process, generally, each thread proceeds with the respective process while in synchronism with another thread (including communications), that is, while maintaining the consistency of the program as a while, as shown in FIG. 3. With this operation, when queuing of synchronization occurs in many places, it is possible that a parallel performance cannot be obtained as expected.

Figure 4:
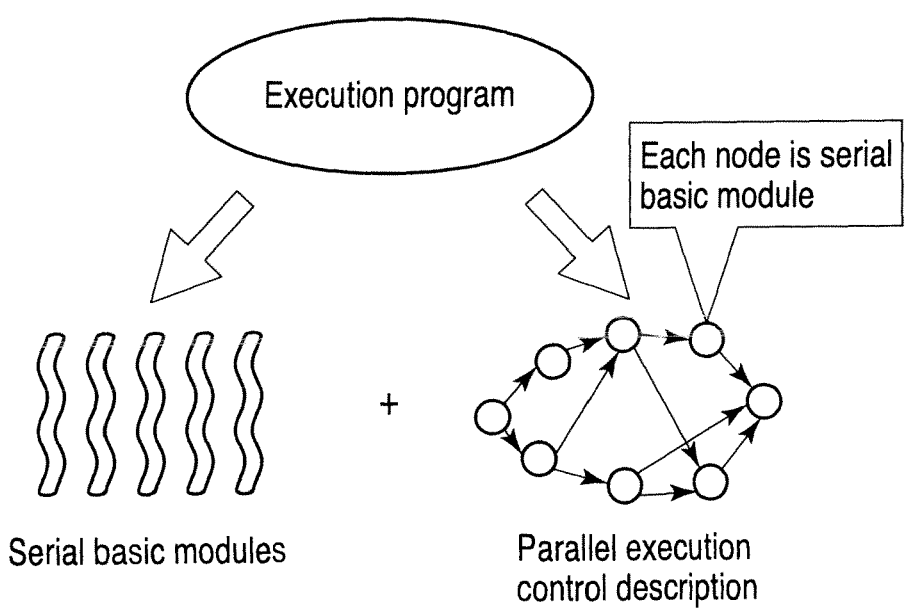
FIG. 4 is a diagram showing the relationship between a serial basic module and a parallel execution control description which constitute a program to be executed by the data processing apparatus of this embodiment.

In order to avoid this, in the embodiment, the program is divided into processing units which can be executed in an asynchronous manner, which does not need to be synchronized with some other module, thereby creating serial basic modules 101, and also a parallel execution control description 102 which defines a partial order of execution of the serial basic modules 101 is created, as shown in FIG. 4. In the parallel execution control, each serial basic module 101 is expressed as a node. As described, a serial basic module is defined as a module of a processing unit which can be executed asynchronously with some other module. Next, with reference to FIGS. 5A and 5B, the parallel execution control description 102 will now be described.

Figure 5A:
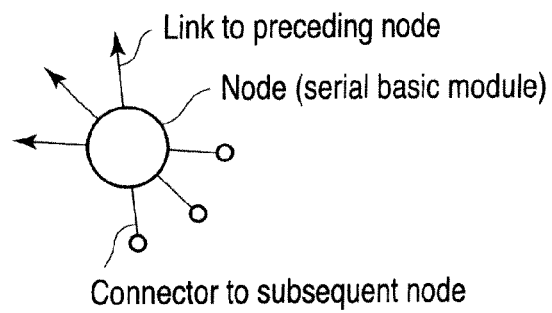
FIG. 5A and FIG. 5B are diagram explaining the parallel execution control description of the program to be executed by the data processing apparatus of this embodiment.
Figure 5B:
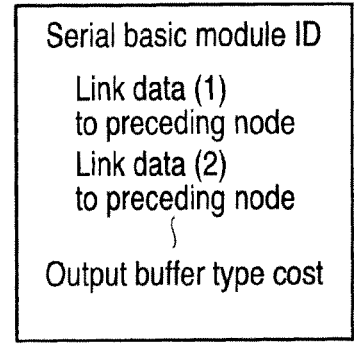

FIG. 5A is a conceptual diagram showing a node which represents a serial basic module 101. As shown in the figure, each serial basic module 101 can be interpreted as a node including a link to a preceding node and a connector to a subsequent node. The parallel execution control description 102 describes link data to the preceding node for each of the serial basic modules 101 and thus it defines the execution order of the serial basic modules 101. FIG. 5B is a diagram showing an example of the parallel execution control description with regard to a serial basic module 101. As shown in the figure, a serial basic module ID, which is the identifier of the respective module, and the link data to the preceding node of the serial basic module 101 are described. Further, data of the output buffer type and the size of data to be generated are described along with them.

These serial basic modules 101 and the parallel execution control description 102 constitute an execution program 100. Now, how the execution program 100 is executed by this computer will now be described.

Figure 6:
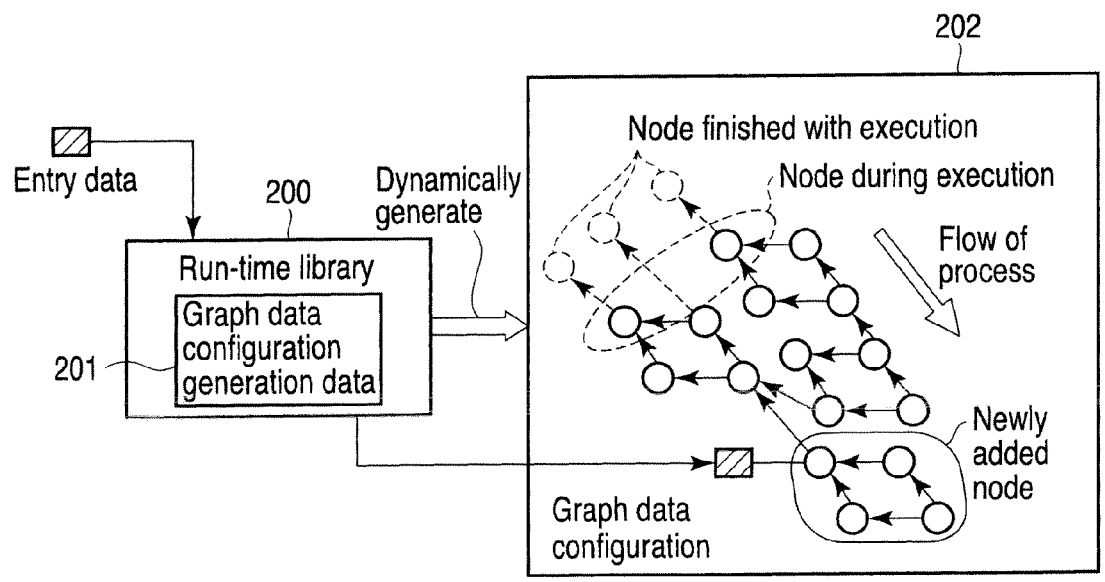
FIG. 6 is a diagram explaining the parallel execution control description of the program to be executed by a run-time library operating on the data processing apparatus of this embodiment.

In order to process the execution program 100 having the above-described configuration in parallel, a run-time library 200 as shown in FIG. 6 is prepared in this computer. The run-time library 200 is stored in the HDD 3 which is a memory medium readable by a computer data processing apparatus. The run-time library 200 loaded onto the main memory from the hard disk drive 3 is executed by the processor 1. The run-time library 200 is provided with a function as a scheduler, and the parallel execution control description 102 is given as graph data configuration generation data 201. The parallel execution control description 102 is created by using, for example, a functional programming language, and it is converted by a translator into the graph data configuration generation data 201.

When a data entry is carried out, it becomes necessary to execute some of the serial basic modules 101 in order to process the data. Each time it occurs, the run-time library 200 dynamically generates or renews a graph data configuration 202 represented by nodes and edges which connect between nodes, based on the graph data configuration generation data 201. The graph data configuration 202 is graph data which indicates the contexts of a group of nodes being executed as needed depending on the situation at that time. The run-time library 200 carries out the addition of the group of nodes to the graph data configuration 202 in consideration of not only, naturally, the context between the nodes to be added, but also the context between nodes in queuing to be executed.

When the run-time library 200 completes the execution of a node, it deletes the node from the graph data configuration 202. Further, the run-time library 200 sets this node as a preceding node, and checks if there is any other preceding node, or whether or not there is a subsequent node with which the other preceding nodes are all completed. If there in a preceding node which satisfies this condition, the run-time library 200 assigns the node to one of the cores 11.

By the operation of the run-time library 200, the parallel execution of the serial basic modules 101 based on the parallel execution control description 102 is allowed to proceed without contradiction. Further, the run-time library 200 executes the modules by a greater number of threads (multi-thread) than the number of cores 11 built in the processor 1. As a result, the computer can be operated as if each core 11 (the run-time library 200 of one thread of each core 11 under OS 300) finds out the serial basic module 101 to be executed next autonomously. The exclusive control between threads stops only when a node is selected from the graph data configuration 202 and the graph data configuration 202 is updated by the run-time library 200, and therefore it is possible to achieve a high parallel performance as compared to the general multi-thread process shown in FIG. 3.

Figure 7:
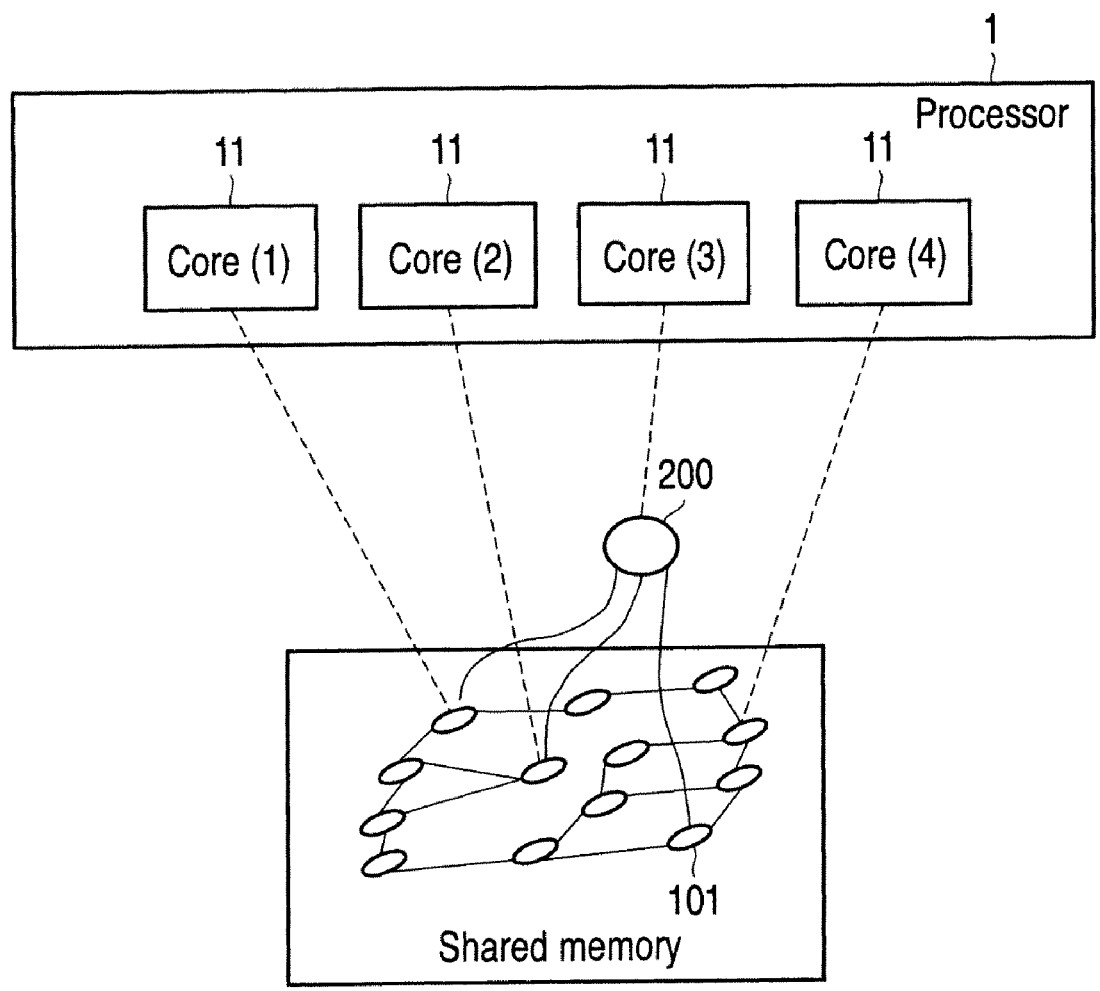
FIG. 7 is a diagram showing an operating state of the run-time library on the data processing apparatus of this embodiment.

FIG. 7 shows the case where there are four cores 11. This figure schematically shows that, of the four cores 11, core (2) executes the run-time library 200 and the run-time library 200 calls a basic module from basic modules 101.

Figure 8:
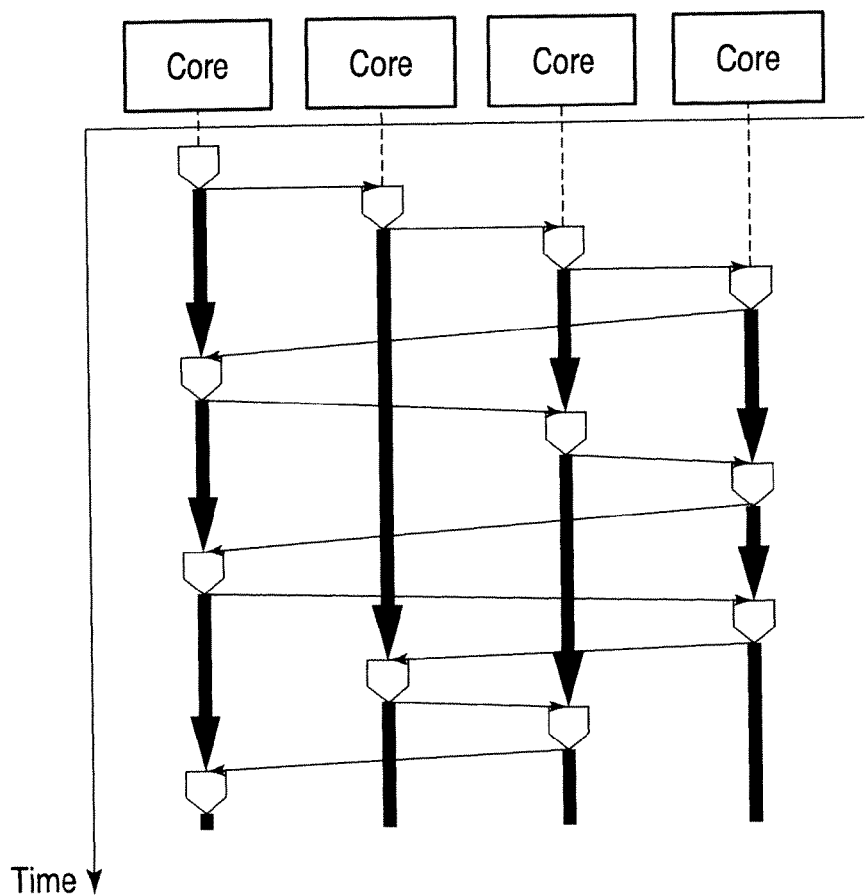
FIG. 8 is a diagram showing an operating state of each of the run-time library and the basic module on the data processing apparatus of this embodiment.

In FIG. 8, pentagonal figures each indicate a run-time library 200, and thick arrows each indicate a basic module. The length of a thick arrow indicates the execution time of the basic module.

Figure 9:
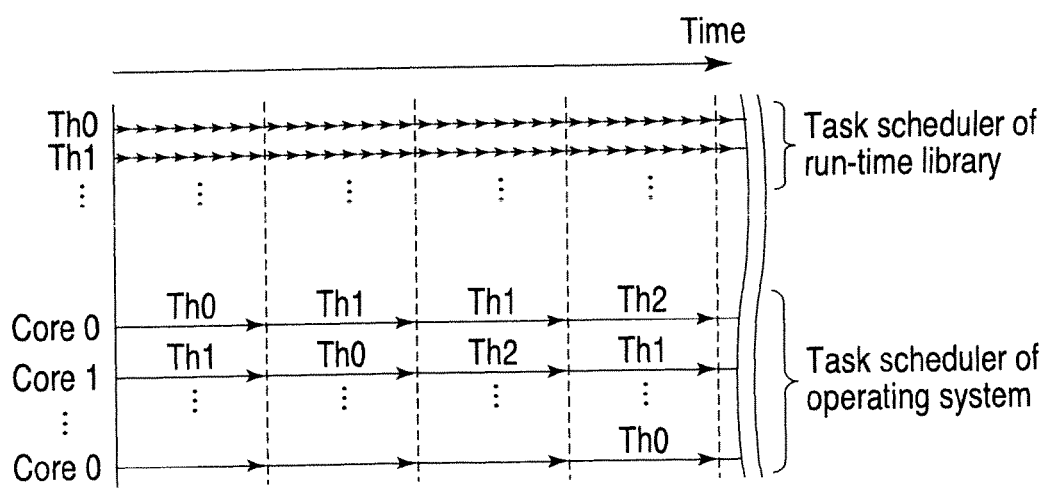
FIG. 9 is a diagram showing a difference between a scheduling granularity of a thread and a granularity of a task scheduled by a parallel run-time environment by an operating system (OS)

Next, FIG. 9 showing a difference between a scheduling granularity of a thread by an operating system (OS) and a granularity of a task scheduled by a run-time library 200. The granularity means the size of processing unit. As the granularity is finer, it becomes possible to increase the chance of parallelization, thereby making it possible to improve the parallel performance.

The run-time library 200 assigns basic modules (tasks) to threads to which thread IDs for identification of respective threads are assigned, and executes the program.

OS reschedules the threads for each time quantum which is the minimum unit of execution time by CPU for switching the process. This is processed with a sufficiently large time quantum in consideration of an overhead of the switching of threads. On the other hand, the parallel scheduling of the tasks provided by the run-time library 200 does not require an interrupt, and therefore it is possible to perform the scheduling at a fine granularity. As the run-time library 200 divides the tasks more finely, the chances of parallelization become higher. Here, if the task scheduler of the run-time library 200 is able to control the move of data between tasks not to cross the cores as less possible, it becomes more possible to suppress caching miss as much as possible when accessing data to be referred to in the task.

However, usually, a special process is required to obtain a core number from an application, and a thread may sometimes moves to some other core while moving, and therefore it is difficult to specify an execution core from the application. Under these circumstances, rendering the occurrence of data transfer between cores to minimum is substituted by rendering the occurrence of data transfer between threads to minimum.

There is no significant difference in performance results even with this course of action is guaranteed by the difference between thread and task in schedule frequency. In the case where the granularity of tasks is large, the affinity of making each thread continue to move on one core as much as possible is designated. In this manner, the data transfer between threads can be lessened to a minimum level, and thus the object of suppressing the data transfer between cores can be achieved.

FIG. 10A shows the graph data configuration managed by the run-time library 200. The run-time library 200 generates the graph data configuration (data flow task graph) and assigns nodes equivalent to the tasks to the processor, thereby executing the parallel process. In practice, a necessary number of threads are activated when starting the program, and each thread selects an executable node from the Ready set (executable set) within the graph data configuration and the task corresponding to the node is executed. When finishing the task, a node to be executable is inserted to the Ready set in accordance with the dependency of the node. At the same time, a new node to be joined to the data flow is generated. This operation is repeated.

In this embodiment, there is provided a method of selecting a node from the Ready set while keeping the cache of each processor and data held by a local memory not to move between cores as much as possible.

Next, the formula for calculating the transfer cost when selecting a mode is shown in formula (I).

$$\text{Cost}(tid, c) = \sum_{n \in Pred(c)} \text{size}(n) \times trCost(n \to tid, tid) \quad (1)$$

The significance of the formula (I) will now be explained with reference to FIG. 10B. FIG. 10B shows a part cut out from the graph data configuration shown in FIG. 10A. As shown in FIG. 10B, there are node a, node b, node c and node d. The node c is a current node selected from the Ready set.

Nodes n is a set of nodes, Pred (c) from which the current node c refers to for data. In the case of the graph data configuration shown in FIG. 10B, the nodes n are node a and node b, and Pred (c) is described as Pred (c)={a, b}. Size (n) is the data size of the calculation results of nodes n to which the node (c) refers, and it is defined in each of the nodes in the graph data configuration shown in FIG. 10B.

Cost(tid, c) is the transfer cost of the entry data of the node c when the node c is assigned to a thread tid to which it is to be assigned. The trCost(n→tid, tid) is the data transfer cost for the transfer from thread n→tid to tid. The n→tid represent the thread id in which node n was executed. When the thread n→tid is equal to thread tid, trCost becomes 0. In the case where thread n→tid is different from thread tid, trCost is set to 1.

If the thread scheduler of OS can designate the affinity in the assignment to the cores, the value of trCost can be defined as the transfer cost between a core and a core in which each thread operates in accordance with the hierarchical structure of the cores.

FIG. 11 is a block diagram showing the function of the run-time library 200.

As shown in FIG. 11, the run-time library 200 includes an execution thread management unit 221, a Ready set management unit 222, a transfer cost calculation unit 223, a node selection unit 225 and a node assignment unit 224.

The node assignment unit 224 executes the process of assigning a node instructed from the node selection unit 225, which will be later explained, to a thread. The execution thread management unit 221 manages the nodes assigned to the threads by the node assignment unit 224 and thread id which indicates each thread assigned. More specifically, a thread id which indicates the thread which executed a node is assigned to the node executed in the graph data configuration 202.

The Ready set management unit 222 detects a node which can be processed by referring to the graph data configuration 202, and adds the detected data to the Ready set. Further, the Ready set management unit 222 deletes a node of the Ready set, which has been processed, from the Ready set.

The transfer cost calculation unit 223 carries out the calculation based on the above-mentioned formula (1), and notifies the calculation result to the node selection unit 225. The node selection unit 225 selects a node whose notified transfer cost is minimum, and notifies the selected node to the node assignment unit 224 as a node to be assigned to a thread.

With reference to the flowchart of FIG. 12, the procedure of the process of selecting a node (basic module) assigned to a thread from the Ready set will now be described.

First, when the process of a node (basic module) is finished, the transfer cost calculation unit 223, which has been executing the node, acquires the thread id (=thread tid) of the thread which has been executing the node (block S11). Then, the transfer cost calculation unit 223 detects nodes contained in the Ready set from the graph data configuration 202, and calculates Cost(tid, c) with respect to each of the detected nodes. The transfer cost calculation unit 223 notifies the calculation results to the node assignment unit 224. Based on the calculation results, the node selection unit 225 selects the node c with minimum Cost(tid, c) as a node to assigned to the thread tid (block S12). The node assignment unit 224 assigns the selected node c to the thread tid.

At the same time, a sequence for the size of the thread tid is prepared in the node data of the graph data configuration managed by the run-time library 200, and the calculation results of Cost(tid, c) are cached therein. With the calculation results in cache, it is not necessary to carry out the calculation for Cost(tid, c) repeatedly a number of times. Even in this case, each time some other thread searches the Ready set, it is necessary to carry out the calculation of the formula (1).

The Ready set carries out management with respect to all threads before. However, it is alternatively possible to carry out management of the Ready set for each thread. With reference to the flowcharts shown in FIGS. 13 and 14, the procedure of the process of selecting a node (basic module) assigned to a thread from the Ready set in the case of managing the Ready set for each thread will now be described.

Now, with reference to the flowchart shown in FIG. 13, the procedure of the process of registering a node which has newly become Ready to the Ready set will now be described. First, the transfer cost calculation unit 223 acquires the data of the node c registered newly to the Ready set from the graph data configuration 202 (block S21). Next, the transfer cost calculation unit 223 calculates Cost(tid, c) with respect to all threads id being executed. The transfer cost operation/selection unit 223 selects a thread tid with which Cost(tid, c) becomes minimum (block S22). It should be noted that in the case where Cost(tid, c) is calculated, in place of calculating the minimum value for all threads id, it suffices if the calculation is carried out only for the thread id which calculates the node to which the node c refers as a substitution. Next, the Ready set management unit 222 registered the node c to the Ready set of the threads tid selected in block S22 (block S23).

Figure 14:
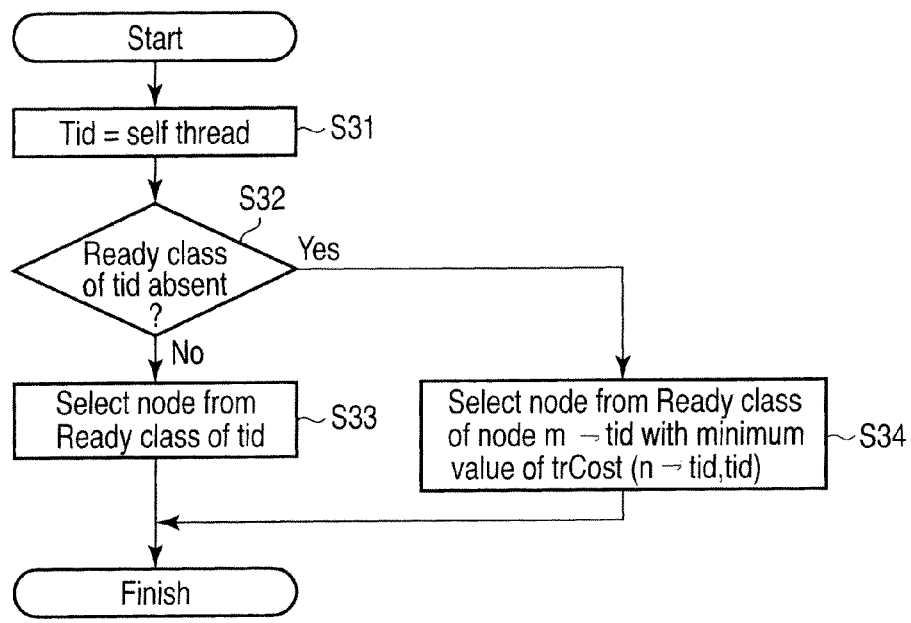
FIG. 14 is a procedure of a selection process in the case where each thread has a ready set.

Next, with reference to FIG. 14, the procedure of the process of selecting a node to be processed next from the Ready set to which threads tid are registered will now be described. First, when a basic module is finished, the node selection unit 225 acquires the thread id (=thread tid) which has been executing the basic module (block S31). Next, the node selection unit 225 judges whether or not nodes are registered in the Ready set of the threads tid (block S32). When nodes are registered (No in block S32), the node selection unit 225 selects a node from the Ready set of the threads tid (block S33). When nodes are not registered (Yes in block S32), the node selection unit 225 selects a node from the Ready set of the threads m.fwdarw.tid in which trCost(m.fwdarw.tid, tid) is minimum (block S34).

It is preferable that the run-time library 200 should record the execution time required for the processing of nodes, and manages the execution time for each thread which called the nodes in the units of nodes. It is also preferable that the run-time library 200 should obtain a time difference between the execution time of a node managed by a thread of itself and the execution time of a node called from the Ready set managed by different threads in the same node, and correct the data size "size (n)" with the value proportional to the obtained time difference. This process is useful for nodes repeatedly executed. When the time periods required for the substantial processes are identical to each other, it is considered that the obtained time difference is equal to the time required to transfer data between threads. Therefore, in consideration of the assumption that the data transfer time and the data size are proportional to each other, the data size will be more accurate. As a result, the transfer cost obtained by the formula (1) will reflects the real process even more.

In order to execute these processes, it is preferable that the run-time library 200 should include an execution time recording module which record the execution time of a basic module for each core, an execution time management module which manages the execution time corresponding to a core for each basic module, an execution time difference operation module which calculates a difference in execution time between cores from the execution time managed by the execution time management module and a data size correction module which corrects the data size from the time difference calculated by the execution time difference operation module. Further, the run-time library 200 obtains the execution time from the difference between the time when the basic module was called (the time when the run-time library 200 was called to return) and the time when the process of the basic module was finished and the time when the run-time library 200 was called once again. It should be noted here that the run-time library 200 may call a node from the Ready set managed by a different thread intentionally in order to obtain a time difference.

With the processed described above, the optimal node can be selected for each thread, and the parallel process of the program can be performed efficiently dynamically during the execution of the program.

Figure 15:
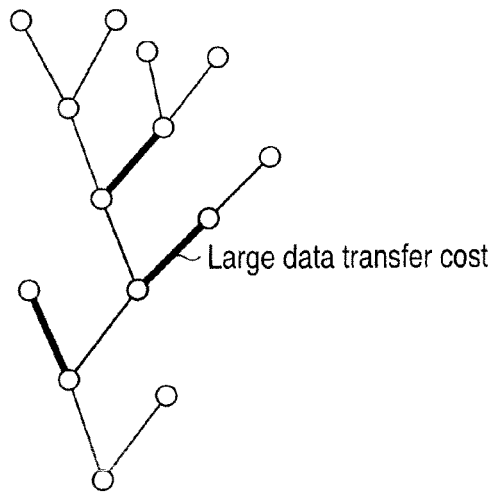
FIG. 15 is a diagram showing a graph data structure in which a data transfer size is visualized.
Figure 16:
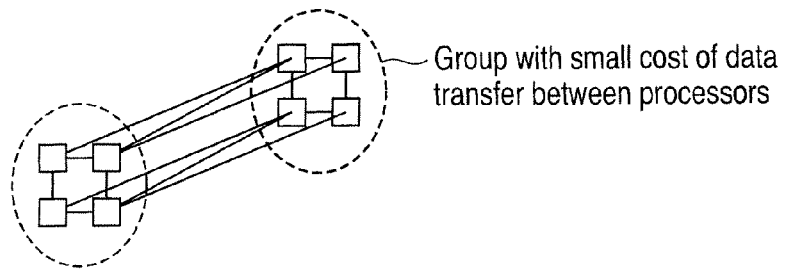
FIG. 16 is a diagram visualizing a data transfer cost between processors.

FIGS. 15 and 16 show examples of the processes of the cases where the affinity is maintained intentionally and it is not maintained by the run-time library 200, thereby indicating visually the difference between the cases as a data transfer cost between nodes.

FIG. 15 shows a graph data configuration which is a visualized data transfer size. As shown in FIG. 15, the thickness of an edge connecting between nodes is changed in accordance with the transfer data size. FIG. 16 visualizes the data transfer cost between processors.

With this illustration, it becomes possible for the programmer to understand by intuition between what tasks a great amount of data is exchanged, and thus the programmer is able to carry out the tuning of the method of dividing the program subjected to the parallel process and its review operation at a high efficiency. In reverse, when the data size transferred between nodes is known in advance, it is possible to visualize the difference in transfer cost between processors by using the value obtained by dividing the difference data by the transfer data size.

Further, the size of data transferred between tasks can be estimated by measuring the difference in performance between the case where nodes are assigned to the same thread intentionally and the case where they are assigned to different threads. Here, it is possible to consider such a procedure that the estimated data are fed back to be reflected in the assignment schedule.

The explanation of the present invention here is based on such a case where the computer is installed with the processor 1 containing a plurality of cores 11 built therein, but naturally, the present invention can be applied to the so-called multi-processor computer installed with a plurality of processors 1.

According to this embodiment, in the run-time library which manages the graph data structure which connects one task to another with data flow, the affinity of the task assignment can be improved to fit with the parallel processing environment when executing a program without the designation by the programmer. Further, even in the case where there is a data definition reference relationship which is not intended by the programmer, or the cost of data transfer is known only when execution of the task, the optimal task scheduling can be carried out adaptively. In this manner, caching error of data accessing or data transfer between local memories are suppressed, thereby making it possible to improve the execution speed of the parallel program.

It should be noted that the present invention, when carried out in practise, is not limited directly to the above-described embodiment, but it can be realized while remodifying the structural elements thereof within the scope where the essence of the invention remains. Further, various types of invention can be achieved by combining or rearranging various structural elements disclosed in the embodiment appropriately. For example, some of the structural elements may be deleted from the entire structure disclosed in the embodiment. Further, structural elements of various versions may be combined together as needed.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A non-transitory computer readable medium contained within an information processing apparatus and executed by a processor, comprising:

execution modules configured to execute threads comprising identifiers; and a scheduler configured to control dynamic assignment of basic modules to threads based on an execution rule so as to execute a program in parallel by the execution modules, the program being divided into the basic modules, the program comprising the execution rule, the execution rule defining an executing order of the basic modules, the basic modules being executable asynchronously with another modules, wherein the scheduler comprises:

a first manager configured to manage identifiers of threads which execute basic modules which have been executed by the execution modules;

a second manager configured to manage an executable set comprising basic modules which are executable by the execution modules;

a cost calculator configured to calculate transfer cost of each of the basic modules in the executable set where data, which is a calculation result of a basic module having been already executed by a first thread in the threads, is transferred from the first thread to a second thread in the threads based on a size of the data and an identifier of thread having executed the basic modules having been executed; and a selector configured to select a basic module with a minimum transfer cost as a basic module to be assigned to the second thread;

the transfer cost is expressed by:

$$\text{Cost} = \sum_{n \in Pr\,ed(c)} size(n) \times trCost(n \rightarrow tid, tid)$$

where Pred(c) represents a set of a part of basic modules comprising a basic module n which outputs first data to which a basic module c of the executable set refers, size (n) indicates a data size of a calculation result of the basic module n, and the trCost(n→tid, tid) is a data transfer cost when the first data is transferred from a thread identified by an identifier (n→tid) which execute the basic module n to a thread identified by an identifier (tid).

2. The non-transitory computer readable medium contained within the information processing apparatus of claim 1, wherein the value of trCost(n→tid, tid) is 0 when the thread identified by the identifier n→tid is equal to the thread identified by the identifier tid.

3. The non-transitory computer readable medium contained within the information processing apparatus of claim 1, wherein the value of trCost(n→tid, tid) is larger than 0 when the thread identified by the identifier n→tid and the thread identified by the identifier tid are different from each other.

4. The non-transitory computer readable medium contained within the information processing apparatus of claim 1, wherein the execution modules are central processing unit (CPU) cores contained in a CPU.

5. The non-transitory computer readable medium contained within the information processing apparatus of claim 1, wherein the execution modules are individual central processing units (CPUs).

6. A parallel processing optimization method to be executed by a information processing apparatus configured to assign dynamically basic modules into which a program is divided to threads comprising identifiers, the program comprising an execution rule which defines a executing order of the basic modules, the basic modules being executable asynchronously with another modules, the information processing apparatus being configured to execute in parallel the threads by execution modules, the method comprising:

causing the information processing apparatus to manage identifiers of the threads which execute the basic modules which have been executed by the execution modules;

causing the information processing apparatus to manage an executable set comprising basic modules;

causing the information processing apparatus to calculate transfer cost of each of the basic modules in the executable set where data, which is a calculation result of a basic module having been already executed by a first thread in the threads, transferred from the first thread to a second thread in the threads based on a size of the data and an identifier of thread having executed the basic modules having been executed; and causing the information processing apparatus to assign, to the second thread, a basic module with a minimum transfer cost in the transfer costs, the transfer cost is expressed by:

$$\text{Cost}(tid, c) = \sum_{n \in Pr\,ed(c)} size(n) \times trCost(n \rightarrow tid, tid)$$

where Pred(c) represents a set of a part of basic modules comprising a basic module n which outputs first data to which a basic module c of the executable set refers, size (n) indicates a data size of a calculation result of the basic module n, and the trCost(n→tid, tid) is a data transfer cost when the first data is transferred from a thread identified by an identifier (n→tid) which execute the basic module n to a thread identified by an identifier (tid).

7. A non-transitory computer-readable storage medium which stores a program for causing a computer to assign dynamically basic modules into which a program is divided to threads comprising identifiers, the program comprising an execution rule which defines a executing order of the basic modules, the basic modules being executable asynchronously with another modules, the information processing apparatus being configured to execute in parallel the threads by execution modules, the program comprising:

causing the computer to manage identifiers of the threads which execute the basic modules which have been executed by the execution modules;

causing the computer to manage an executable set comprising basic modules;

causing the computer to calculate transfer cost of each of the basic modules in the executable set where data, which is a calculation result of a basic module having been already executed by a first thread in the threads, is transferred from the first thread to a second thread in the threads based on a size of the data and an identifier of thread having executed the basic modules having been executed; and causing the computer to select a basic module with a minimum transfer cost as a basic module to be assigned to the second thread, the transfer cost is expressed by:

$$\text{Cost}(tid, c) = \sum_{n \in Pred(c)} size(n) \times trCost(n \to tid, tid)$$

where Pred(c) represents a set of a part of basic modules comprising a basic module n which outputs first data to which a basic module c of the executable set refers, size (n) indicates a data size of a calculation result of the basic module n, and the trCost(n→tid, tid) is a data transfer cost when the first data is transferred from a thread identified by an identifier (n→tid) which execute the basic module n to a thread identified by an identifier (tid).

* * * * *